United States Patent
Altintas (10) Patent No.: US 8,290,426 B2
(45) Date of Patent: Oct. 16, 2012

(54) MOBILE RADIO COMMUNICATION SYSTEM AND RADIO COMMUNICATION METHOD

(75) Inventor: Onur Altintas, Tokyo (JP)

(73) Assignees: Toyota Infotechnology Center Co., Ltd., Tokyo (JP); Toyota Jidosha Kabushiki Kaisha, Toyota (JP)

(*) Notice: Subject to any disclaimer, the term of this patent is extended or adjusted under 35 U.S.C. 154(b) by 116 days.

(21) Appl. No.: 12/866,551

(22) PCT Filed: Feb. 19, 2009

(86) PCT No.: PCT/JP2009/052914
§ 371 (c)(1),
(2), (4) Date: Aug. 6, 2010

(87) PCT Pub. No.: WO2009/104689
PCT Pub. Date: Aug. 27, 2009

(65) Prior Publication Data
US 2010/0323694 A1 Dec. 23, 2010

(30) Foreign Application Priority Data
Feb. 21, 2008 (JP) ................. 2008-039777

(51) Int. Cl.
*H04H 60/00* (2008.01)
(52) U.S. Cl. ............ 455/3.05; 455/3.01; 455/3.04; 455/414.1
(58) Field of Classification Search .......... 455/3.01, 455/3.02, 3.04, 3.06, 414.1, 432.3, 435.2, 455/464, 516, 521, 62, 509, 63.1, 513; 340/10.3, 340/7.1, 7.22
See application file for complete search history.

(56) References Cited

U.S. PATENT DOCUMENTS

| 6,434,480 | B1 | 8/2002 | Kubota et al. |
| 7,783,316 | B1* | 8/2010 | Mitchell .................. 455/521 |
| 2006/0063543 | A1 | 3/2006 | Matoba et al. |
| 2007/0253394 | A1 | 11/2007 | Horiguchi et al. |
| 2010/0035553 | A1 | 2/2010 | Shinada et al. |

FOREIGN PATENT DOCUMENTS

| JP | A-2000-207679 | 7/2000 |
| JP | A-2003-101457 | 4/2003 |
| JP | A-2006-094005 | 4/2006 |
| JP | A-2007-088941 | 4/2007 |
| JP | A-2007-184850 | 7/2007 |
| JP | A-2007-300419 | 11/2007 |
| WO | WO 2008/129660 A1 | 10/2008 |

OTHER PUBLICATIONS

International Search Report dated Mar. 17, 2009 in International Application No. PCT/JP2009/052914.

* cited by examiner

*Primary Examiner* — Jean Gelin
(74) *Attorney, Agent, or Firm* — Oliff & Berridge, PLC (57) ABSTRACT

In a mobile radio communication system of the cognitive radio method, a database device has a use state table indicating a probability that each frequency band is used for each period of time and for each location. An on-vehicle terminal acquires a frequency band having the highest probability that the band is empty at the current time and the current location according to the use state table and performs a radio communication by using the frequency band. The use state table is preferably created by a statistical process using the database device which acquires the use states of frequency bands of various locations and times by using respective vehicles as probe cars. Thus, it is possible to detect the frequency of the empty state in a short time.

4 Claims, 7 Drawing Sheets

MOBILE RADIO COMMUNICATION SYSTEM AND RADIO COMMUNICATION METHOD

TECHNICAL FIELD

The present invention relates to a mobile radio communication system.

BACKGROUND ART

In order to cope with the insufficiency of frequency bands available for radio communication, cognitive radio has been studied and developed in recent years. The basic concept of cognitive radio is that a radio terminal is configured to have the function of recognizing or knowing the radio environment around it and to select a frequency and scheme to be used in radio communication in accordance with the radio environment, whereby the spectral efficiency is enhanced. Specifically, the cognitive radio terminal scans frequency bands to recognize the radio environment thereby detecting the use state, and use an available frequency band. This enables radio communication with good spectral efficiency utilizing all the frequency bands, theoretically.

Patent Document 1: Japanese Patent Application Laid-Open No. 2007-300419
Patent Document 2: Japanese Patent Application Laid-Open No. 2000-207679

DISCLOSURE OF THE INVENTION

Problem to be Solved by the Invention

However, if cognitive radio is used in a radio network made up of mobile objects such as vehicles that move at high speed, the following problem arises.

In cognitive radio, it is necessary to scan frequency bands before establishing wireless connection, in order to find an unused frequency band. Such scanning of frequency bands takes a certain length of time. On the other hand, in the case of mobile objects such as vehicles that move at high speed, it is necessary that communication be started immediately. This is because if communication cannot be started immediately, the distance to the party at the other end becomes larger as the vehicle moves at high speed, and/or information to be communicated becomes out of date with the lapse of time.

Since real time scanning of wide frequency bands is difficult to perform in the current state of art, it is difficult to apply cognitive radio to mobile objects that move at high speed.

The present invention has been made in view of the above described situations and has an object to provide a technology that enables detection of empty (or unused) frequency bands in a short time in a mobile radio communication system.

Means for Solving the Problem

To achieve the above object, according to the present invention, radio communication is performed using the following means or process.

A mobile radio communication system according to the present invention includes a plurality of mobile terminals and a database apparatus, in which the mobile terminals perform radio communication by selecting an available frequency. In this specification, the mobile terminals include terminals such as notebook computers, PDAs, and cellular phones that are portable, and terminals that are fixedly mounted on motorcars or the like but can move because the objects (such as motorcars) on which they are mounted are mobile objects. In this specification, the database apparatus refers to an apparatus that allows data input from the outside, can accumulate the input data, and can process the accumulated data. The database apparatus may be composed, physically, of a single computer or a plurality of cooperating computers distributed in a network.

The database apparatus according to the present invention has a use state table that states the probability that each frequency band is in use for each time and for each location. The mobile terminal obtains this use state table from the database apparatus and performs radio communication using a frequency band that would be unused at a high probability at a time when it attempts radio communication at a location at which the terminal is located at that time, based on the use state table.

Since the use state table contains the probability that each frequency band is in use for each time and for each location, the mobile terminal can estimate the probability that each frequency band is unused at the current location at the present time. Therefore, the mobile terminal performs radio communication using a frequency band that would be unused at a high probability. Specifically, it scans a frequency band that would be unused at a high probability, and if the frequency band is actually unused, it performs radio communication using this frequency band. In this process, the mobile terminal may select either the frequency band that would be unused at the highest probability or an arbitrary frequency band that would be unused at a probability higher than a specific probability.

Since the mobile terminal can know a frequency band that would be unused at a high probability, based on the use state table as described above, the scanning time can be made shorter than in the case where frequency bands are scanned in a predetermined order to detect a frequency band that is not in use.

It is preferred that the use state table according to the present invention be created by the following means and processes. It is preferred that the plurality of mobile terminals according to the present invention each have use state detection means for detecting whether each frequency band is in use or unused, location information obtaining means for obtaining information on the terminal's own location, and transmission means for transmitting the use state of the frequency band obtained by the use state detection means together with the information on the terminal's own location to the database apparatus. It is preferred that the database apparatus according to the present invention have reception means for receiving and accumulating the use state of frequency bands and information on location from the mobile terminals, and analysis means for creating the aforementioned use state table from the received use state of frequency bands and information on location.

Each of the mobile terminals having the aforementioned means scans an arbitrary frequency band at certain timing and transmits the result to the database apparatus together with the information on location. The database apparatus can accumulate the use state of frequency bands transmitted from the mobile terminals and calculate the probability that each frequency band is in use for each time and for each location by statically processing the data.

The present invention may be viewed as a mobile radio communication system having at least one or some of the above-described means. Furthermore, the present invention may be viewed as a radio communication method including at least one or some of the above-described processes, or a program for implementing this method. The above-described means and processes may be adopted in any possible combination to constitutes the present invention.

Advantageous Effect of the Invention

According to the present invention, a frequency band that is not in use can be found in a short time in a mobile radio communication system.

DESCRIPTION OF THE REFERENCE SIGNS 1 vehicle
2 database apparatus
10 antenna
11 radio transmission/reception section
12 use state detection section
12a power measurement section
12b band setting section
13 GPS apparatus
14 spectrum state transmission section
15 communication band determination section
16 parameter setting section
21 transmission section
22 storage section
23 analysis section
24 transmission section

THE BEST MODE FOR CARRYING OUT THE INVENTION

In the following, a preferred embodiment of the present invention will be described in detail by way of example with reference to the drawings.

(General Configuration of System)

Figure 2:
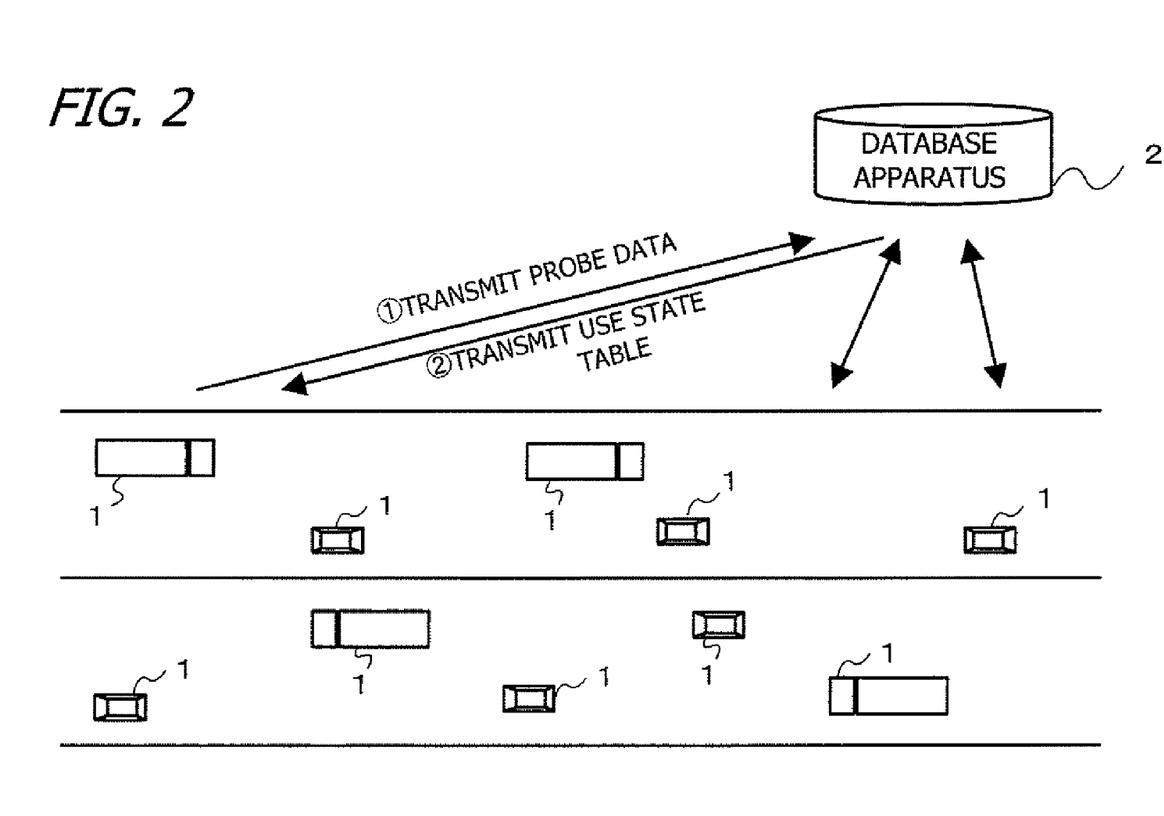
FIG. 2 is a diagram showing the outlines of a mobile radio communication system according to the embodiment.

FIG. 2 is a diagram showing the general configuration of a mobile radio communication system according to the embodiment. The radio communication system is composed of a plurality of vehicles 1 and a database apparatus 2. Each vehicle 1 can communicate with the database apparatus 2 bidirectionally. Each vehicle 1 communicates with the database apparatus 2 via a communication equipment (access point) provided on the roadside. The database apparatus 2 may be composed of either a single computer or a plurality of computers located separately. Communication means between the vehicles 1 and the database apparatus 2 is not limited to the roadside communication equipment, but it may be any communication means such as a cellular phone network or a satellite communication network.

Each vehicle 1 in this radio communication system performs cognitive radio communication, namely senses the environmental use state of radio resources to detect an available frequency band, and performs radio communication in that frequency band. To detect an available frequency band, it is necessary to perform scanning of frequency bands. However, when many frequency bands are in use, a significantly long time is needed to detect an unused band, depending on the order of scanning. In view of this, in this embodiment, a reduction in the scanning time is to be achieved by creating and using a use state table as described in the following.

Figure 3:
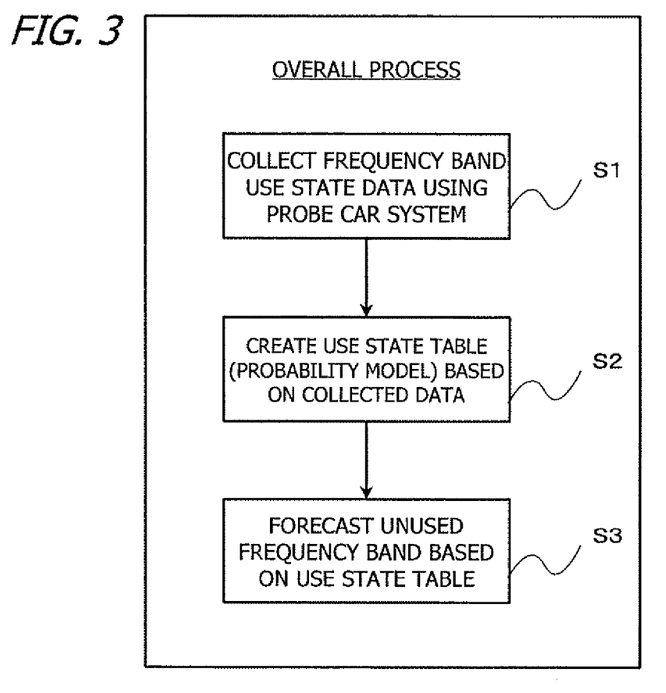
FIG. 3 is a flow chart showing the flow of the overall process of a radio communication method according to the embodiment.

FIG. 3 is a flow chart showing the outlines of the overall process in this embodiment. First, as a preliminary process, the use states of frequency bands at various locations and times are collected by vehicles 1 serving as probe cars (S1). The collected data is accumulated in the database apparatus 2. After a certain amount of data has been accumulated, the data is statistically processed, whereby a use state table that states the probability that each frequency band is in use for each time and for each location (S2) is created. The use state table is distributed to the vehicles 1. A vehicle 1 that attempts to start radio communication selects a frequency band that would be unused (or empty) at a high probability based on the use state table, and uses the selected band for radio communication (S3). Thus, since the vehicle 1 can recognize frequency bands that would be unused at a high probability based on the use state table, the possibility that the scanned frequency bands turn out to be in use can be reduced, and therefore a reduction in the scanning time can be achieved.

<Construction>

[Terminal on Vehicle]

Figure 1:
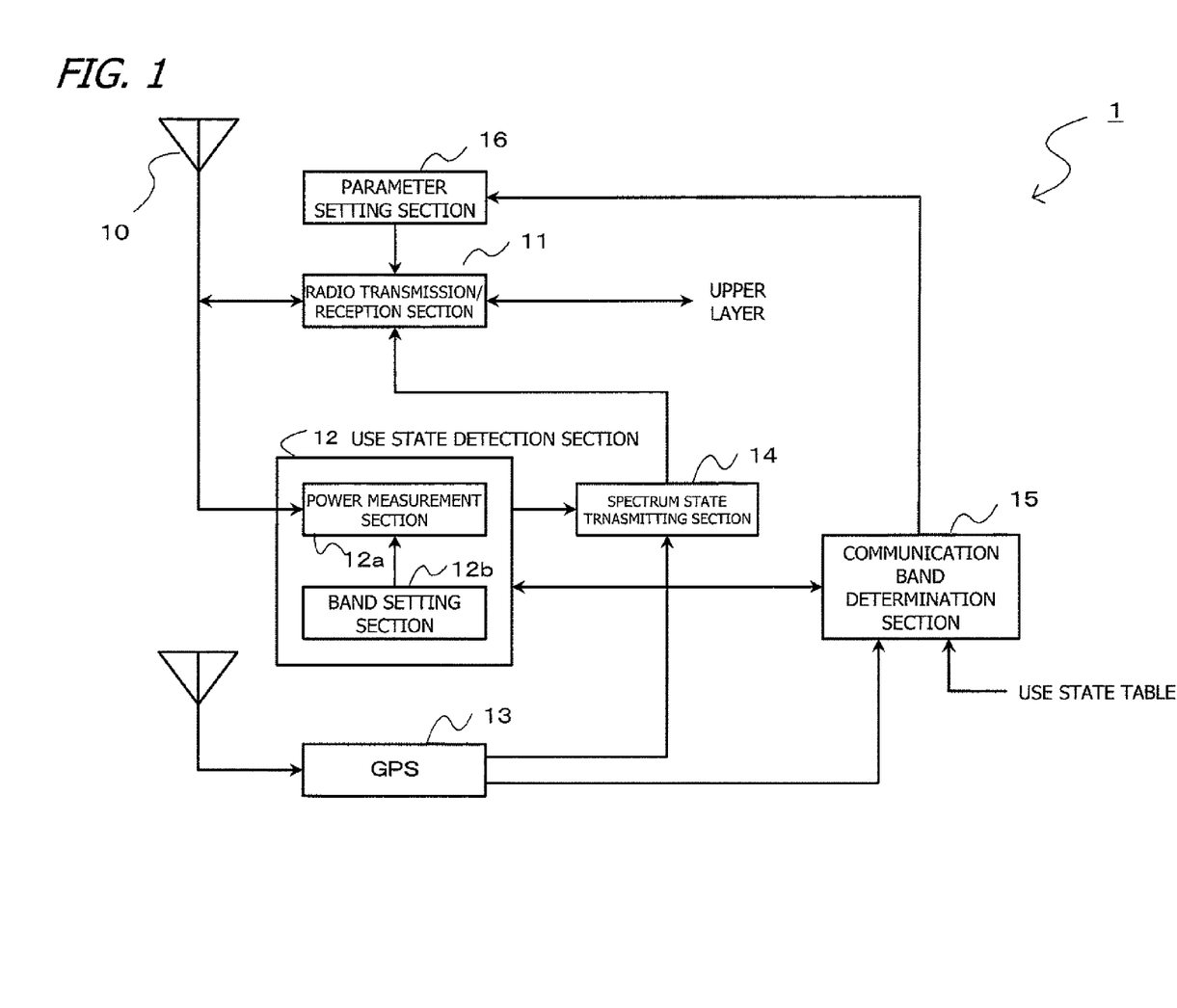
FIG. 1 is a diagram showing functional blocks of a vehicle (or mobile terminal) according to an embodiment.

FIG. 1 is a block diagram showing the functional configuration of a vehicle 1. The vehicle 1 has an antenna 10 through which radio signals are transmitted and received, a radio transmission/reception section 11 that demodulates received signals and modulates signals to be transmitted, a use state detection section 12 that detects the use state of an arbitrary frequency band, a GPS apparatus 13 that obtains the current location, a spectrum state transmission section 14 that transmits the use state of an arbitrary frequency band to the database apparatus 2, a communication band determination section 15 that determines a frequency band to be used for radio communication, and a parameter setting section 16 that controls the radio transmission/reception section 11 and sets necessary parameters.

In the following the operations of the respective sections will be described.

In the transmission process, data to be transmitted is supplied to the radio transmission/reception section 11 from the upper layer, and the radio transmission/reception section 11 modulates the data for radio transmission and supplies it to the antenna 10. On the other hand, radio signals received through the antenna 10 are demodulated in the radio transmission/reception section 11, and the demodulated data is passed to the upper layer. The parameter setting section 16 is a function that is necessary to perform cognitive radio and sets parameters such as a radio channel (or radio frequency) to be used, modulation type, and transmission power. The radio transmission/reception section 11 performs modulation and demodulation of radio signals based on the parameters set by the parameter setting section 16.

The use state detection section 12 is composed of a power measurement section 12a and a band setting section 12b to detect the use state of a radio channel set by the band setting section 12b. When detecting the use state, it quadrature-demodulates a received signal to measure the fluctuation in the amplitude. If the fluctuation in the amplitude is on par with the noise level, it is concluded that the channel is not in use. The detection of the use state of a radio channel may be performed by cyclostationary feature detection that detects the cyclostationarity of signals. Alternatively, the detection of the use state of a radio channel may be performed using a matched filter. In addition, the detection of the use state of a radio channels (or carrier sense) may be performed using any existing technology.

The GPS apparatus 13 receives GPS signals from GPS satellites, and obtains information on the terminal's own location. The terminal's own location may be determined not only based on GPS signals but also by performing a correction of the detected location using map (road) data and a gyro or an acceleration sensor.

The communication band determination section 15 determines the radio channel (or frequency band) to be used for radio communication based on a use state table obtained from the database apparatus 2 and the current location. As described later, the communication band determination section 15 attempts radio communication using the radio channel that would be most probably unused (empty). The selected frequency is notified to the use state detection section 12, where whether or not the selected frequency is actually unused is detected. If the selected frequency is actually unused, the used frequency band determination section 15 sets communication parameters with the aid of the parameter setting section 16 so that the radio transmission/reception section 11 can communicate using this frequency band.

[Database Apparatus]

Figure 4:
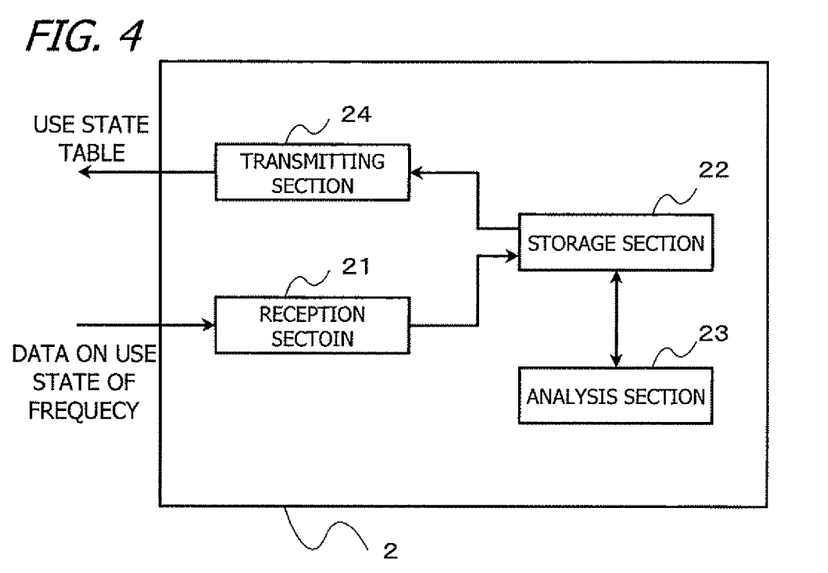
FIG. 4 is a diagram showing functional blocks of a database apparatus according to the embodiment.

FIG. 4 is a block diagram showing the functional configuration of the database apparatus 2. The database apparatus 2 has a reception section 21 that receives frequency use state data from the vehicles 1, a storage section 22 that stores the received data, analysis means 23 that statistically processes the frequency use state data accumulated in the storage section 22 to create the use state table that states the probability that each frequency band is unused for each time and for each location, and a transmission section 24 that transmits the use state table thus created to the vehicles 1.

The database apparatus 2 is, as hardware, a computer including a CPU (Central Processing Unit), a main storage device, and an auxiliary storage apparatus etc. The above-described functional sections of the database apparatus 2 are implemented by execution of programs by the CPU. Some or all of the above-described functional sections may be implemented by a dedicated chip(s). The above-described functional sections may be implemented by a plurality of computers.

(Details of Process)

In the following, the details of each process in the overall process shown in FIG. 3 will be described.

Figure 5:
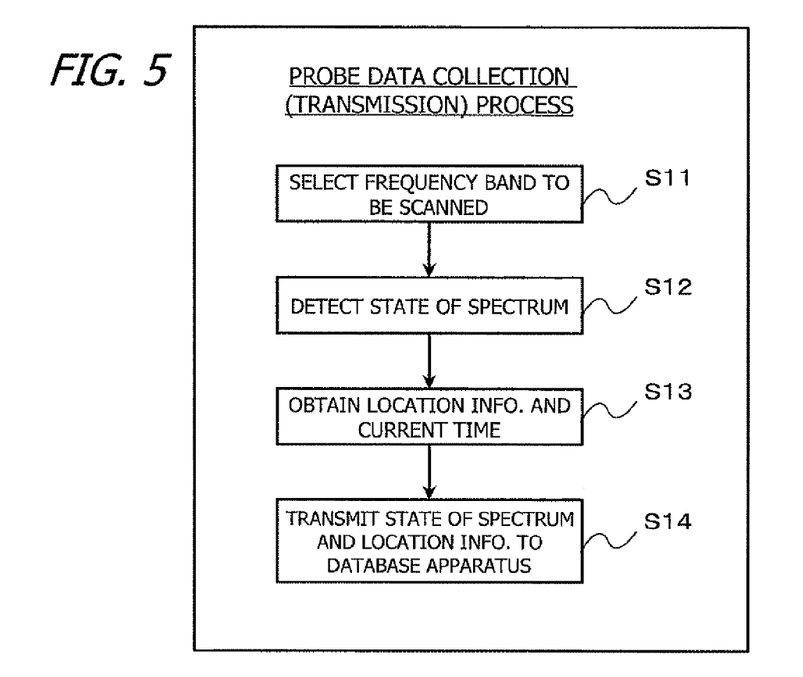
FIG. 5 is a flow chart showing the flow of a probe data collecting process.

FIG. 5 shows the details of the process of collecting probe data (S1 in FIG. 3). First, the vehicle 1 selects a frequency band to be scanned (S11). In this step, the frequency band may be selected arbitrarily. The scanned frequency band may be either a single channel or a frequency band having a certain width within a certain range. Next, the use state detection section 12 detects the use state of radio wave in the selected frequency band (S12). The vehicle 1 obtains the current time and information on its own location using the GPS apparatus 13 (S13). The spectrum state transmission section 14 transmits the use state of the scanned frequency band, the information on the vehicle's own location, and the current time together to the database apparatus 2 (S14). The frequency scanning (S11, S12) and the obtainment of the location information may be performed in the reversed order, or they may be performed at the same time.

Figure 6A:
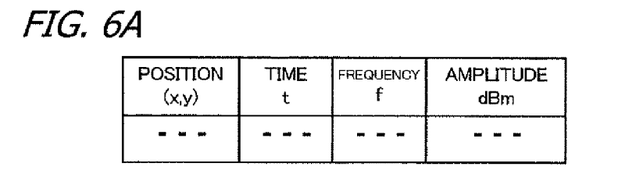
FIG. 6A shows an exemplary format of probe data sent from a vehicle to the database apparatus.
Figure 6B:
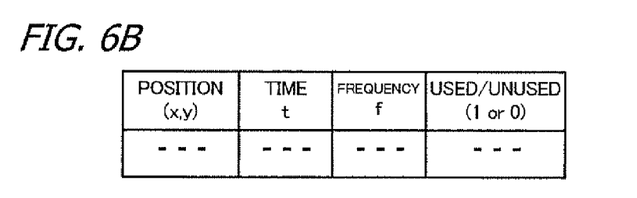
FIG. 6B shows an exemplary format of probe data sent from a vehicle to the database apparatus.
Figure 6C:
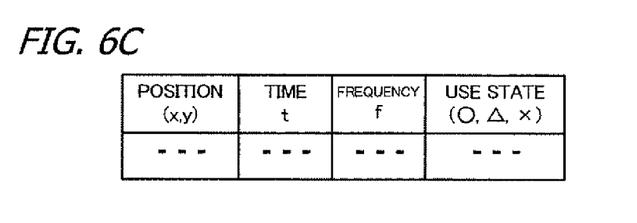
FIG. 6C shows an exemplary format of probe data sent from a vehicle to the database apparatus.

Exemplary formats of the data transmitted to the database apparatus 2 are shown in FIGS. 6A to 6C. All of the three examples shown in FIGS. 6A to 6C contain the location information (latitude and longitude), time, frequency, and use state. What is transmitted as the use state is the amplitude of the radio signal in the case shown in FIG. 6A, a used/unused flag (1 or 0) in the case shown in FIG. 6B, and information on the classified level of the use state in the case shown in FIG. 6C. The location information may be an ID for identifying the area in which the vehicle is located among segmented areas prepared beforehand, instead of the information on the latitude and longitude. Although in the above-described cases the transmitted data contains the time of detection of the spectrum state, the time information may be excluded from the transmitted data, and the time at which the database apparatus 2 receives the data from the vehicle 1 may be regarded as the time of detection of the spectrum state.

In this way, the database apparatus 2 collects data from the probe cars. The data collection is performed for a certain period of time, and when a certain amount of data has been collected, the database apparatus 2 statistically processes the collected data to create the use state table that states the probability that each frequency band is unused for each time and for each location (S2 in FIG. 3)

Each area has characteristics in regard to which frequency band(s) is/are highly probably used at each time.

Figure 7:
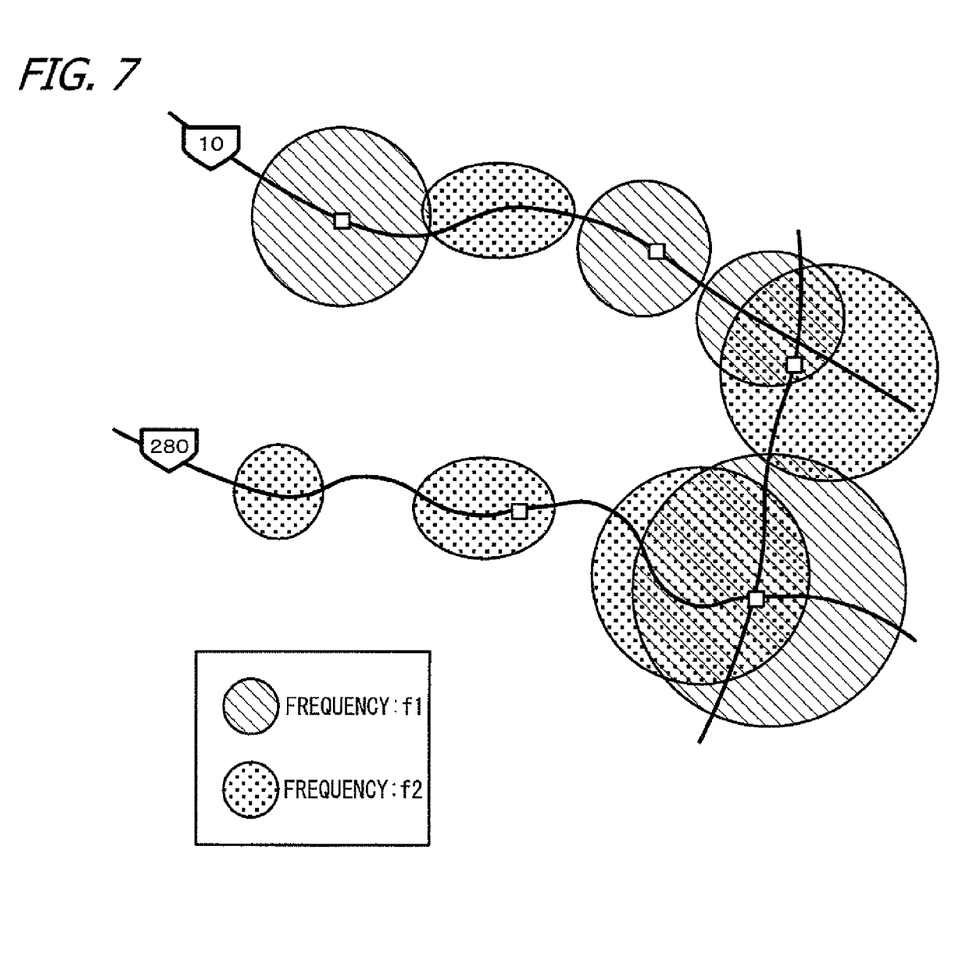
FIG. 7 is a schematic diagram showing the use state of frequencies f1 and f2 at a certain time.

For example, as things stand, the frequency bands that are in use differ among areas. FIG. 7 is a schematic diagram showing the use state of two frequencies f1 and f2 at a specific time. In this way, the locations in which one frequency band is used may differ from the locations in which another frequency band is used. One of the reasons for this may be inhomogeneous distribution of radio terminals that use a specific radio frequency band. In addition, the use state of frequency bands in a specific area may vary depending on time. For example, in one area, various frequency bands may be used in the morning and evening but not used so much in the daytime characteristically, and in another area, cellular phones (approximately 1.5 GHz) may used frequently in the morning, wireless LANs (2.4 GHz, 5 GHz) may be used in the daytime, and ham radios (144 MHz, 430 MHz etc.) may be used frequently in holidays.

Figure 8:
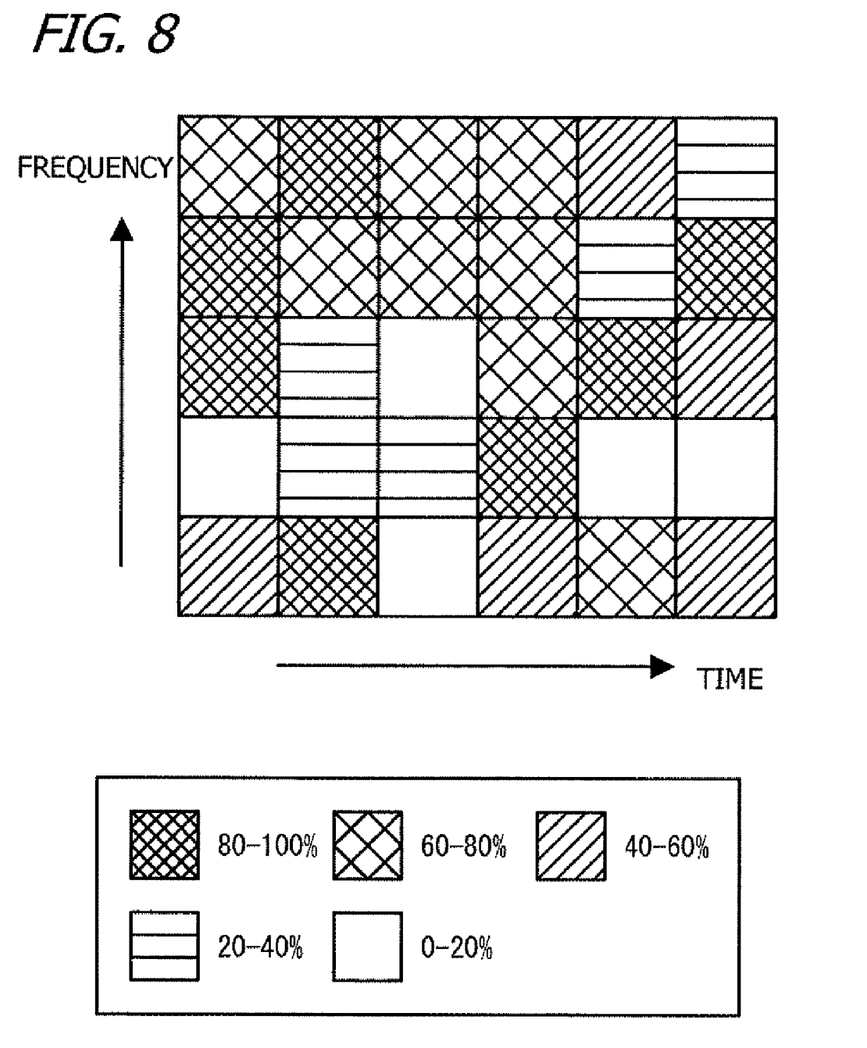
FIG. 8 is a diagram showing the probabilities that the respective frequencies are used at a certain location in different time periods.

In view of the above, the database apparatus 2 creates the use state table that states the probability that each frequency band is used for each area and for each time by averaging the collected probe data. FIG. 8 is a conceptual diagram of the use state table thus created. FIG. 8 shows the use state of several frequencies in different time periods in a specific area. In other words, a table like that shown in FIG. 8 is prepared for each area. The length of a time period in the use state table may be set arbitrarily. For example, the length of a time period may be set to be one hour or two hours. Different use state tables may be prepared for different days. For example, different calculations may be performed for weekdays (i.e. Monday to Friday) and holidays (i.e. Saturday, Sunday, and national holidays) to prepare different tables. Alternatively, different calculations may be performed for different days of the week to prepare different tables. The size of one area to which the same use state table is applied and the way of defining the area may be determined arbitrarily. The simplest way is to define rectangular areas based on latitude and longitude information. For example, it is easy to set one area as a rectangular section defined by a point having a latitude of Lat0° and a longitude of Lng0° and a point having a latitude of Lat0°1' and a longitude of Lng0°1'. The segmentation of areas may be done by other methods, and the fineness of area segmentation may be selected arbitrarily.

The use state tables created in the database apparatus 2 are distributed to the vehicles 1. When attempting radio communication, the vehicle 1 forecasts a frequency band that would be unused at a high probability, using the use state tables, and attempts radio communication in that frequency band (S3 in FIG. 3)

Figure 9:
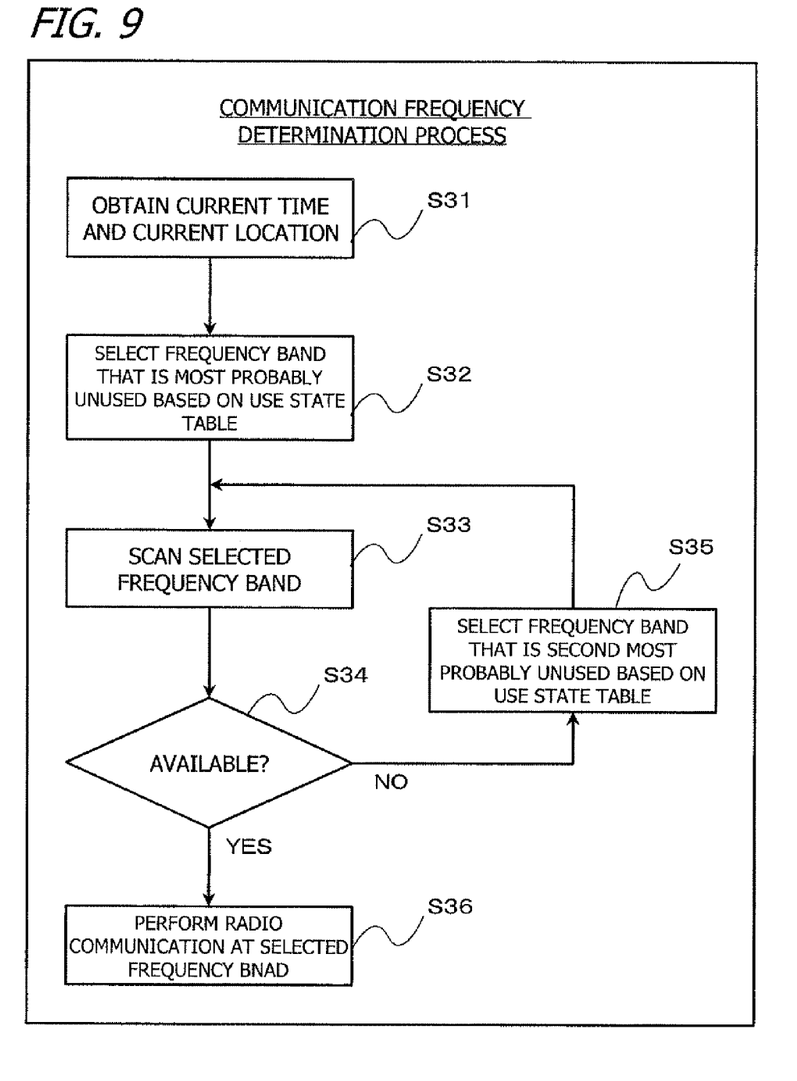
FIG. 9 is a flow chart showing the flow of a process of determining a frequency to be used.

FIG. 9 shows details of the process executed by the vehicle 1 to determine the frequency to be used. The vehicle 1 first obtains the current time and current location from the GPS apparatus 13 (S31). Then, the used frequency band determination section 15 selects the frequency band that is most probably unused at the present time in the area in which the vehicle is located, based on the use state table obtained from the database apparatus 2, the current location, and the current time (S32). The selected frequency band is notified to the use state detection section 12, where it is scanned, whereby it is determined whether or not the frequency band is actually unused (S33). If the frequency band is in use, or not available (NO in S34), the frequency band that is second most probably unused is selected with reference to the use state table (S35), and a determination is made as to whether or not this frequency band is actually unused. On the other hand, if the selected frequency is unused, or available (YES in S34), radio communication is performed using the selected frequency band (S36).

[Operation/Advantageous Effects of the Embodiment]

As described above, by starting the scanning from a frequency band that would be unused at a high probability based on the use state table, the time required to find an available frequency band can be reduced. In the case of mobile objects such as vehicles that move at high speed, it is required to start communication immediately. This embodiment can satisfy this requirement.

There has been known a technology in which in order for each terminal to recognize an available frequency band(s) to thereby reduce the scanning time in cognitive radio, a frequency band to be used is notified to a management server or the like so that the use state of frequencies is always managed by the management server. The method of this embodiment is by far easier than this method, and can be implemented at lower cost. In addition, it can provide an advantageous effect that an available frequency band can be found immediately.

Furthermore, since the use state tables stating the use state of frequencies are created using a probe car system, data can be collected for a wide area at low cost.

<Modification>

In the above description of the embodiment, each of the vehicles 1 has been described to have both the function of collecting/transmitting probe data (i.e. use state of a frequency) and the function of cognitive radio. However, in this radio communication system, some vehicles may have only the function of collecting/transmitting probe data or only the function of cognitive radio that determines a frequency to be used based on the use state table.

According to the above description, the vehicle 1 selects, in attempting radio communication, the frequency band that is most probably unused with reference to the use state table. However, in order to reduce the scanning time, it is not necessarily required to select the frequency band that is most probably unused, but it is sufficient to select a frequency band that would be unused at a probability that is higher than a specific threshold value.

It is preferred that the use state table be updated on a regular basis after the creation thereof. It is preferred that each vehicle scan a frequency band(s) on a regular basis and send the result of scanning to the database apparatus 2, while it performs cognitive radio using the use state table. When a certain amount of data is accumulated, the database apparatus 2 may update the use state database, and send the updated use state tables to the vehicles.

The invention claimed is:

1. A mobile radio communication system comprising a plurality of mobile terminals and a database apparatus, in which the mobile terminals select an available frequency band to perform radio communication, wherein:
    said database apparatus has a use state table that states a probability that each frequency band is in use for each time and for each location, which is obtained by statistically processing data representing the use state of frequencies received from said plurality of mobile terminals and accumulated data; and
    said mobile terminal obtains said use state table from said database apparatus and detects whether a frequency band that would be, according to said use state table, unused at a high probability at a time when said mobile terminal attempts radio communication at a location at which said mobile terminal is located at that time is in use or unused, and if this frequency band is unused, performs radio communication using this frequency band.

2. The mobile radio communication system according to claim 1, wherein:
    said plurality of mobile terminals each comprise use state detection means for detecting whether each frequency band is in use or unused, location information obtaining means for obtaining information on the terminal's own location, and transmission means for transmitting the use state of the frequency band obtained by said use state detection means together with the information on the terminal's own location; and
    said database apparatus comprises reception means for receiving and accumulating the use state of frequency bands and information on location from the mobile terminals, and analysis means for creating said use state table from the received use state of frequency bands and information on location.

3. A radio communication method in a mobile radio communication system including a plurality of mobile terminals and a database apparatus, comprising:
    by said database apparatus, receiving and accumulating data representing a state of frequencies from said plurality of mobile terminals, creating beforehand a use state table that states a probability that each frequency band is in use for each time and for each location by statistically processing the accumulated data, and holding the use state table; and
    by said mobile terminal, obtaining said use state table from said database apparatus, detecting whether a frequency band that would be, according to said use state table, unused at a high probability at a time when said mobile terminal attempts radio communication at a location at which said mobile terminal is located at that time is in use or unused, and if this frequency band is unused, performing radio communication using this frequency band.

4. The radio communication method according to claim 3, wherein:
by said plurality of mobile terminals, detecting whether a certain frequency band is in use or unused, obtaining information on the terminal's own location, and transmitting the detected use state of the frequency band to said database apparatus together with the information on the terminal's own location; and
by database apparatus, receiving and accumulating the use state of frequency bands and information on location from the mobile terminals, and creating said use state table from the received use state of frequency bands and information on location.

* * * * *